US009069739B2

(12) United States Patent
Shribman et al.

(10) Patent No.: US 9,069,739 B2
(45) Date of Patent: Jun. 30, 2015

(54) SYSTEM AND METHOD FOR TRANSFORMING HIERARCHICAL OBJECTS

(75) Inventors: Aidan Eli Shribman, Tel-Aviv (IL); Nadav Helfman, Binyamina (IL); Or Igelka, Ramat Gan (IL)

(73) Assignee: SAP Portals Israel Ltd., Ra'anana (IL)

( * ) Notice: Subject to any disclaimer, the term of this patent is extended or adjusted under 35 U.S.C. 154(b) by 1523 days.

(21) Appl. No.: 12/494,360

(22) Filed: Jun. 30, 2009

(65) Prior Publication Data

US 2010/0023925 A1    Jan. 28, 2010

Related U.S. Application Data

(63) Continuation-in-part of application No. 12/178,676, filed on Jul. 24, 2008.

(51) Int. Cl.
G06F 17/00 (2006.01)
G06F 17/22 (2006.01)
G06F 9/44 (2006.01)

(52) U.S. Cl.
CPC ............ *G06F 17/227* (2013.01); *G06F 9/4435* (2013.01)

(58) Field of Classification Search
CPC ..................... G06F 17/227; G06F 17/2282
USPC ..................... 715/239; 717/136, 137
See application file for complete search history.

(56) References Cited

U.S. PATENT DOCUMENTS

| 2003/0167445 A1* | 9/2003 | Su et al. ................. 715/513 |
| 2004/0268249 A1* | 12/2004 | Fennelly et al. ............. 715/523 |
| 2005/0132282 A1* | 6/2005 | Panditharadhya et al. ... 715/516 |
| 2005/0216917 A1* | 9/2005 | Krishnaswamy et al. .... 719/315 |
| 2005/0257193 A1* | 11/2005 | Falk et al. ................. 717/109 |
| 2007/0220022 A1* | 9/2007 | Lankinen et al. ............ 707/101 |
| 2008/0140705 A1* | 6/2008 | Luo ........................ 707/103 R |

* cited by examiner

*Primary Examiner* — Scott Baderman
*Assistant Examiner* — Howard Cortes

(57) ABSTRACT

A method and system for transforming a first object into a second object, comprising: receiving the source and second objects; subject to the objects being of attribute type, copying, the value of the source object to the second object; subject to the objects being of node type which comprises, for each member of the second object: locating a corresponding member having a corresponding name in the source object; and invoking the method for the member and the corresponding member; subject to the objects being of list type, the source object adapted to contain elements of a first type and the second object adapted to contain elements of a second type, for each element of the source object: creating a corresponding default element of the second type; and invoking the method for the element and the corresponding default element; and invoking a user-implemented transformation routine.

9 Claims, 4 Drawing Sheets

SYSTEM AND METHOD FOR TRANSFORMING HIERARCHICAL OBJECTS

RELATED APPLICATIONS

The present application claims the benefit under 35 U.S.C. §120 to, and is a continuation in part of application Ser. No. 12/178,676 filed Jul. 24, 2008, the full contents of which are incorporated herein by reference.

TECHNICAL FIELD

The present disclosure relates to software object management in general, and to a method and system for transforming objects of one type into objects of another type, in particular.

BACKGROUND

In many situations it is required to transform software objects from one structure to another. The term object may refer to an actual software structure which has allocated memory space and resides in the memory of the computer, or to a description of an object, which is stored in a persistent storage, such as a file or a database residing on a storage device.

Object transformation refers to situations in which content is received in the form of a first representation, and a second representation is to be constructed using some or all of the content. The situations include but are not limited to upgrading a first object crated by or associated with an early version of a product, into a second object created by or associated with a more advanced version; deriving from a relatively large object a lighter representation to be transferred over the communication channel; transforming database structures, or the like.

In some applications, one or more objects to be transformed are hierarchical objects. A hierarchical object is an object in which some fields or members may be simple attributes that may be assigned a value, while at least one member is a list or another container, comprising further attributes, lists or containers.

Some known methods for object transformation include XSLT, which transforms between XML structures. Aside from the hierarchy handling, XSLT is in essence similar to "sed", "awk" or other text manipulation systems, since XSLT is unaware of the internal structures of the underlying objects. Therefore, among other deficiencies, XSLT does not eliminate fields of the old object which are not required in the new object, does not perform simple conversions, and others.

Thus, a programmer using XSLT still has to manually provide all the specific field and member transformations, and little work is performed automatically.

An approach similar to XSLT relates to transforming an object of a first type to an object of a second type by following a change list. However, this approach requires an ordered change list, and is thus suitable for two objects, wherein the second of which was derived by a chain of changes from the first one.

Casting operators, which are common in object-oriented programming languages are operative only in casting objects from a derived class into objects of a base class or vice versa, and are not applicable in transformations between alien objects.

There is thus a need in the art for a method and system for transforming objects in general, and hierarchical objects in particular, from a first representation into a second representation. The method and system should automatically transform all possible fields or members of the objects. For those fields or members that require business logic or other operations for conversion, the method and system should provide easy access for a user to complete the transformation.

SUMMARY

A method and system for transformation between objects, for purposes including upgrade, passing an object or part thereof through a communication channel.

One aspect of the disclosure relates to a method for transforming a source object into a destination object, comprising: receiving the source object and the destination object; subject to the source object and the destination object being of attribute type, copying the value of the source object to the destination object; subject to the source object and the destination object being of node type which comprises one or more members, for each member of the destination object; locating in the source object a corresponding member having a corresponding name; and invoking the method for the member and the corresponding member; subject to the source object and the destination object being of list type, the source object adapted to contain elements of a source type and the destination object adapted to contain elements of a second type, for each element of the source object: creating a corresponding default element of the second type and adding the default element to the destination object; and invoking the method for the element and the corresponding default element; and invoking a user-implemented transformation routine. The method can further comprise retrieving from a storage device a description of the source object or the destination object and constructing the source object or the destination object. Within the method, the source object and the destination object are optionally hierarchical objects having members of types selected from the group consisting of: an attribute; a node comprising at least one attribute, node or list member; and a list adapted to contain one or more elements, the elements being of type attribute or node. Within the method, the destination object is optionally an upgrade of the source object, or a message derived from the source object. Within the method, the source object is optionally derived from the destination object, the destination object representing a message. Within the method, the source object and the destination object optionally represent database objects.

In accordance with another aspect of the disclosure, there is thus provided a system for transforming a source object into a destination object, comprising: a component implementing a class hierarchy, wherein the source object and the destination object are derived from the class hierarchy; a base transformation component implementing automatic transformation of at least one element of the source object into one or more elements of the destination object; and a framework for user-implemented transformation routine, for allowing a user to define transformation of one or more second elements of the source object into one or more second elements of the destination object. The system can further comprise an input/output communication component for communicating with an input or output device. Within the system, the source object and the destination object are optionally hierarchical objects having members of types selected from the group consisting of: an attribute; a node comprising one or more members of type attribute, node or list; and a list adapted to contain one or more elements, the elements being of type attribute or node. Within the system, the destination object is optionally an upgrade of the source object. Within the system, the destination object is optionally a message derived from the source object. Within the system, the source object is optionally derived from the destination object representing a message. Within the system, the source object and the destination object optionally represent database objects.

Yet another aspect of the disclosure relates to a method for transforming a source hierarchical object into a destination hierarchical object, comprising: receiving a source hierarchical object and a destination hierarchical object, the source hierarchical object and the destination hierarchical object having members of types selected from the group consisting of: an attribute; a node comprising one or more members of type attribute, node or list; and a list adapted to contain one or more elements, the elements being of type attribute or node; subject to the source hierarchical object and the destination hierarchical object being of attribute type, copying the value of the source hierarchical object to the destination hierarchical object; subject to the source hierarchical object and the destination hierarchical object being of node type which comprises one or more members, for each member of the hierarchical destination object: locating a corresponding member having a corresponding name in the source hierarchical object; and invoking the method for the member and the corresponding member; subject to the source hierarchical object and the destination hierarchical object being of list type, the source hierarchical object adapted to contain elements of a first type and the destination hierarchical object adapted to contain elements of a second type, for each element of the source hierarchical object: creating a corresponding default element of the second type; and invoking the method for the element and the corresponding default element; and invoking a user-implemented transformation routine.

Yet another aspect of the disclosure relates to a computer readable storage medium containing a set of instructions for a general purpose computer, the set of instructions comprising: receiving a source object and a destination object; subject to the source object and the destination object being of attribute type, copying the value of the source object to the destination object; subject to the source object and the destination object being of node type which comprises one or more members, for each member of the destination object: locating a corresponding member having a corresponding name in the source object; and invoking the method for the member and the corresponding member; subject to the source object and the destination object being of list type, the source object adapted to contain elements of a first type and the destination object adapted to contain elements of a second type, for each element of the source object: creating a corresponding default element of the second type; and invoking the method for the element and the corresponding default element; and invoking a user-implemented transformation routine.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
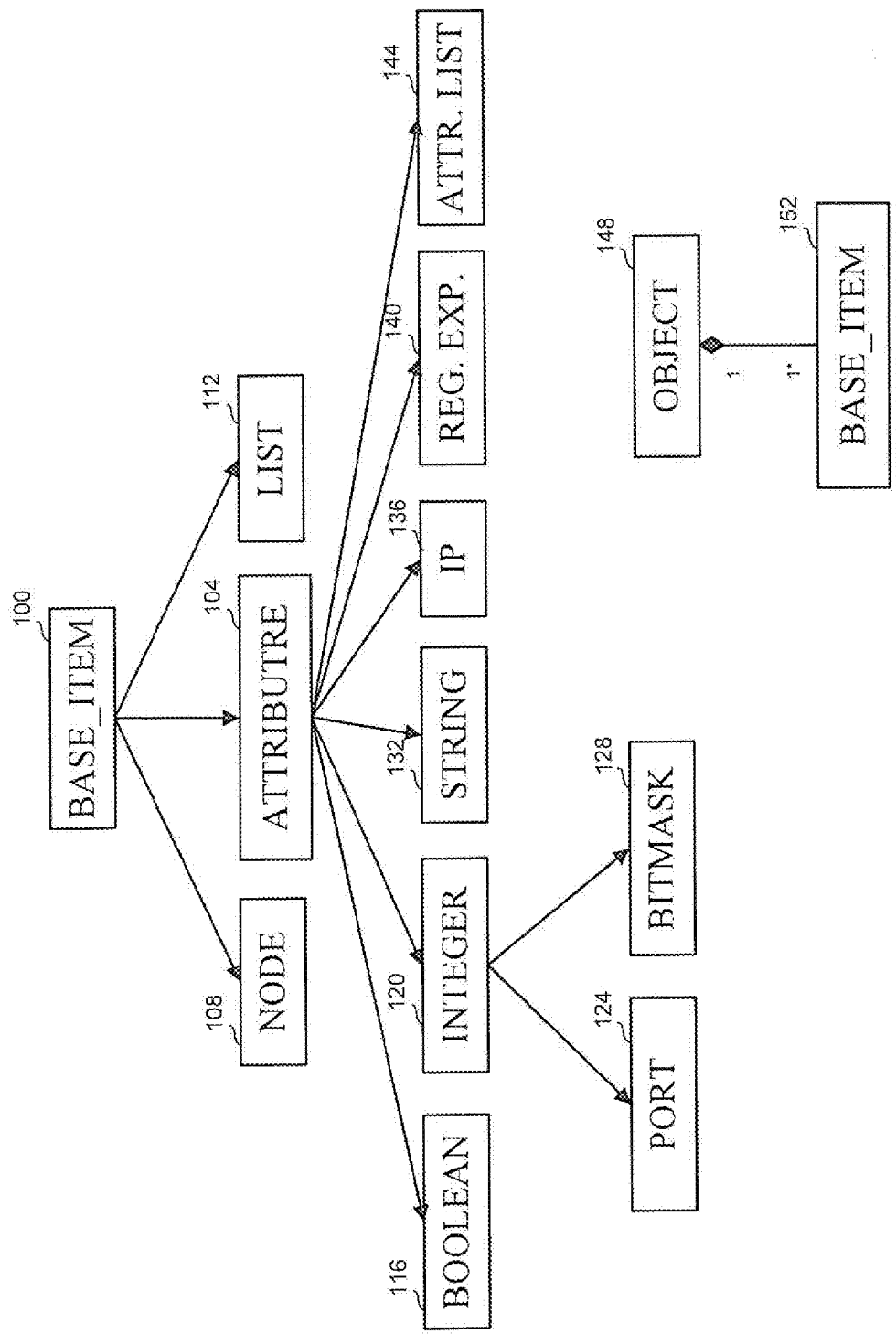
FIG. 1 is a schematic illustration of an object class hierarchy, for which a command line interface is provided, in accordance with the disclosure.

A system and method for providing transformation between hierarchical objects which comprise fields or members derived from a set of basic types.

The disclosure can operate with any object hierarchy. For demonstration and simplicity purposes, an exemplary hierarchy of objects is provided. The object hierarchy is based on objects of three types: an attribute type which has a name and a value, a list type having elements of a particular structure, and a node type, which comprises a static structure consisting of attributes, lists, or further nodes. The exemplary hierarchy is further detailed in association with FIG. 1 below.

The transformation method and system receive a source object of a source type or a source object description, and a destination object or a destination object description.

If a description of the source or destination objects is received, the method and system create a first or a second object, having member values in accordance with the description, or default values.

If the first and second objects are of attribute type, the transformation between the source object and destination object is performed such that the destination object receives the respective value of the source object.

Then, if both objects are of list type, the list members of the source object are traversed. For each list element, a corresponding object having an element type of the second list is constructed, and the transformation is called recursively for the traversed child element and newly constructed child element.

If both objects are of node type, then for each member of the destination object, a member having the same name is searched for in the source object, and if found, the transformation is called recursively for the source member and the destination member.

In addition, at each level, i.e., at the source object level and at each subsequent activation of the transformation, a hook function is called with the correct context, i.e., the current object. At the hook function, the user can define the required transformation for cases at which the required transformation is between fields having different names or locations in the hierarchy, or which require business logic or other operations.

Thus, the provided transformation operates a "best effort" approach, at which all items having corresponding names are transformed automatically from the source object to the destination object, and a hook transformer is provided for allowing a user to define additional transformations.

In some embodiments, a main program code and base transformation class are provided, in which the base transformation class has a transformation method which receives the source object and the destination object, implements the automatic transformation and calls the hook method. For each specific source object type and destination object type, a user derives the base transformation class, and implements the hook method for the source object type and destination object type combination.

The user then compiles the program including the base transformation class and the derived class, and can use the resulting executable for transforming objects derived from the class hierarchy.

The main program calls the automatic transformation, which in turn calls the user-defined hook method.

Referring now to FIG. 1, showing a schematic object class diagram of the exemplary object hierarchy. The disclosed transformation method is adapted to provide transformation between a source object and a target object in an automatic manner where possible, and to provide a user with an option to provide the rest of the transformations in a convenient manner.

At the base of the hierarchy, there is a base_item class 100. Base_item class 100 is inherited by attribute class 104, which implements a pair of name and value. Another class inheriting base_item 100 is node_item 108 which implements a collection of base_item objects or objects inheriting base_item. Node_item 108 maintains a static set or any other data structure of the members it contains, so the members can be traversed. Yet another class inheriting base_item 100 is list_item 112 which implements an ordered list of elements, wherein each element is also derived from the class hierarchy, i.e., it is an attribute, anode or a list. Similarly to the node_item, a field of type list_item keeps track of the elements on its list, so as to enable traversal. Attribute_item class 104 is inherited by a number of classes, each implementing a particular value type, such as a Boolean attribute class 116, integer attribute class 120, string attribute class 132, IP attribute class 136, and regular expression attribute class 140. For example, IP attribute class 136 comprises a validity check that the value is of the form x,y,z,w, while x, y, z and w are between 0 and 255. Integer attribute class 120 is further inherited by port attribute class 124, and by bitmask attribute class 128, wherein the port number or the bitmask are implemented as integers with additional limitations.

Base_item 100 is also inherited by attribute_list class 144, which can handle multiple attributes of the same type. In some embodiments, the items may be separated by a predefined delimiter. For example, a list of space-delimited Attr_IP could be set with the value "10.1.1.1 10.1.1.2 10.1.1.3". In order to remove one of the IPs, for example the value of "10.1.1.3", the value of the attribute can be re-set to "10.1.1.1 10.1.1.2". Manipulating an attribute list may include listing, adding an attribute, deleting an attribute, emptying the list, or the like.

Base_item 100 may implement a number of methods applicable to all objects, such as: "equal" for comparing two objects: name_set and name_get for setting and retrieving the object's name; class_name and instance_of for getting the name of the class and determining whether an object is of a particular type; clone_new for creating a new object and cloning the content of an existing one; clone_copy for cloning the copy of a first existing object into a second existing object; parent_set and parent_get for setting and getting the parent of a base_item object; key_get, key_set and key_equals for setting getting and comparing keys of objects; search and search path for searching for a particular object within a list or node; is-valid for validating the integrity of an object; template_get and template_set for defining initiated objects which can be used as a template for newly created object, and load and save methods. The load and save methods receive as parameter a target, such as XML, string, memory, database and in particular a hierarchical database such as LDAP or the like. Each descendant object may override any one or more of the item_base methods, or avoid overriding them and use the base_item's implementation. For example, a "save" method for an item_list generally traverses the list and calls "save" for each item in the list.

When a new class is defined and objects are created as instances of the class, such as object 148, it is optionally defined to contain members 152 of the various classes shown above that inherit item_base. For example, a Network class is of node type, and may contain a member of string_attribute type which may be named "host name" and is assigned a value of the host name, a member of type IP_attribute having an IP address as value, a member of type list which contains multiple elements of type IP_attribute, or the like. The members are registered with the class, so that the class is aware of its members and can iterate over them.

Node objects constructed in accordance with the class hierarchy are self aware, i.e., all their members are registered with them, and they can enumerate and traverse through the members. Similarly, all list objects are self aware and can traverse through the list elements.

Figure 2:
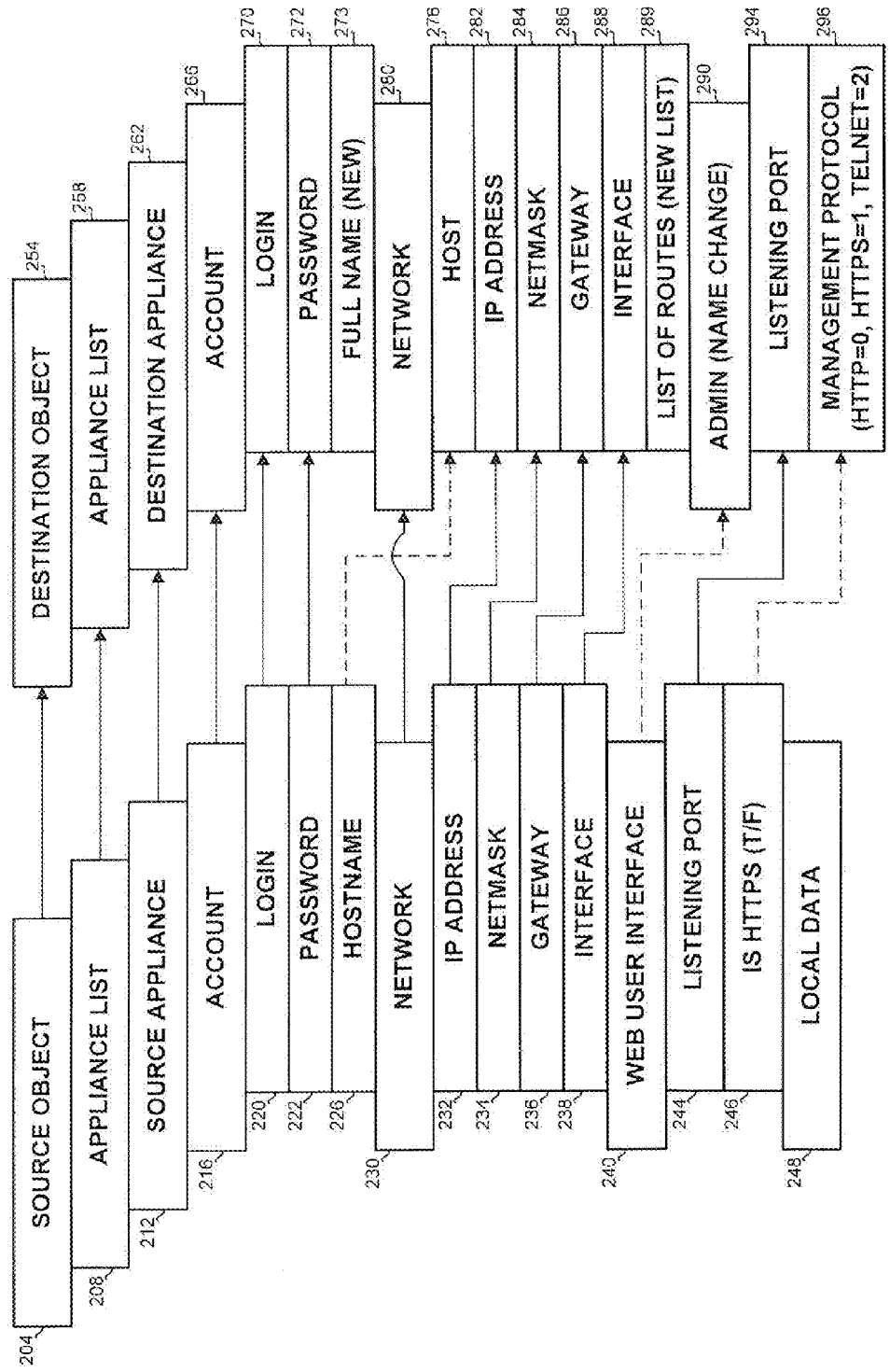
FIG. 2 shows exemplary structures of a source object and a destination object, and the required transformations from the source object to the destination object.

Referring now to FIG. 2, showing exemplary structures of a source object and a destination object, and the required transformations.

Source object 204 and destination object 254 are objects of different types deriving from node type 108 of FIG. 1. Source object 204 comprises appliance list member 208 which is a list comprising a variable number of source appliance nodes 262. Destination object 254 also comprises appliance list member 258 which is a list comprising a variable number of destination appliance nodes 262. However, source appliance node 212 and destination appliance node 262 are of different structure.

When transforming source object 204 into destination object 254 it is required to transform each source appliance of appliance list 208 of source object 204 into a corresponding destination appliance in appliance list 258 of destination object 254.

Source appliance node 212 comprises an account node 216 having the attributes of login 220, password 222 and hostname 226. Destination appliance node 262 comprises an account node 266 having the attributes of login 270, password 272 and full name 273. Login 270 and password 272 should be the same as login 220 and password 222, respectively. Full name 273 is exclusive to destination appliance 262.

Source appliance node 212 further comprises a network node 230, comprising the attributes of IP address 232, netmask 234, gateway 236 and interface 238. Destination appliance node 262 also comprises a network node 280, comprising the attributes of host 276 which should be the same as hostname 226 of source appliance 212.

Network node 280 further comprises IP address 282, netmask 284, gateway 286 and interface 288, which should have the same value as IP address 232, netmask 234, gateway 236 and interface 238.

Network node 280 further comprises a list of routes 290, which is not to be derived from source object 204, but rather has an initial default value, such as an empty list.

Source appliance node 212 comprises also a web user interface node 240, which comprises the attributes of listening port 244 and is_https attribute 246 which is a Boolean attribute. Destination appliance node 262 comprises an admin node 290, which is similar but not identical to web user interface node 240 of source appliance object 262, and comprises listening port 294 which should be the same as listening port 244, and management protocol attribute 296, whose value is related to is_https attribute 246.

Source appliance object node 212 comprises also local data attribute 248 which has no associated node in destination appliance object node 262.

Figure 3:
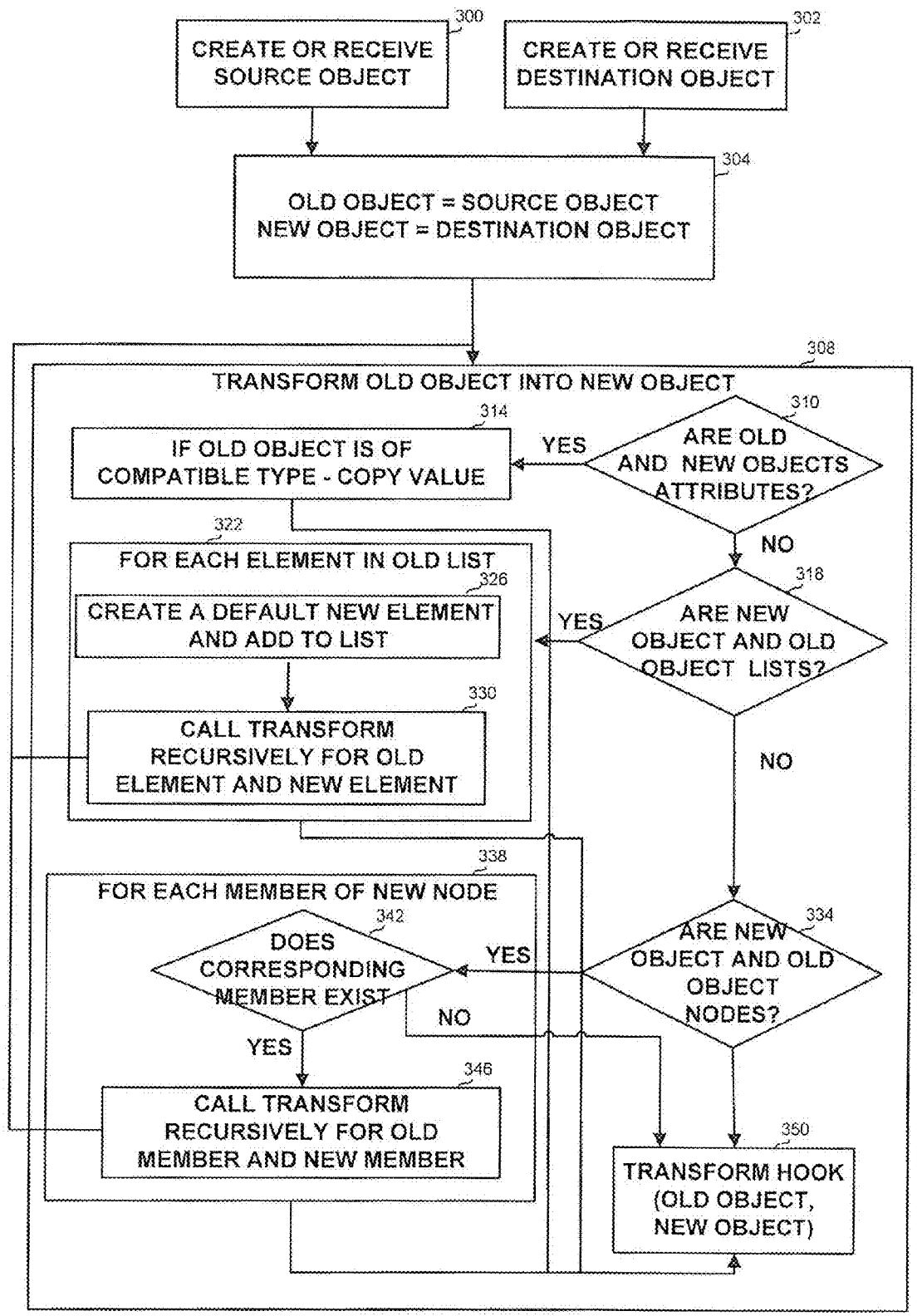
FIG. 3 is a flowchart of the main steps in a method for transforming objects derived from the class hierarchy of FIG. 1, in accordance with the disclosure.

Referring now to FIG. 3, showing a flow chart of the main steps in a method for transforming objects derived from the class hierarchy shown in FIG. 1. The method is then demonstrated for the source and destination objects of FIG. 2.

On step 300 a source object, i.e., a memory location representing an object is received. Alternatively, the source object is created from a description such as an XML file, LDAP repository, any proprietary description, database or the like.

On step 302 a destination object is received. The object may be a default object created in order to be used during transformation. Alternatively, the destination object is created upon a description such as an XML file, HTML file, any proprietary description, database or the like.

On step 304, an old object variable is assigned the source object, and a new object variable is assigned the value of the destination object.

In transformation step 308 the old object is transformed into the new object. On step 310 it is determined whether the old object and the new object are of an attribute type. If it is, then on step 314, if the old object is of a type compatible with the new object, then the value of the old object is copied to the new object. Compatible types relate to identical types, or to types which are straight forward to convert, such as integer to real, enumeration to integer, IP address to string, or the like. In an alternative embodiment, only if the new object and the old object are of exactly the same type, the value is copied.

If the new object is not of an attribute type, then on step 318 it is determined whether the new object and the old object are both of list type. If they are, then on step 322 the old list is transformed into a new list. On step 326, for each list-element in the old object, a corresponding list-element is created and added to the new object.

On step 330, transformation step 308 is called recursively for the old list element and the newly created list element.

If the new object and the old object are not both lists, then on step 334 it is determined whether the new object, and the old object are both of node type. If they are, then on step 338 the old node is transformed into a new node. The transformation is performed by traversing the members of the new node. For each member, it is determined on step 342 whether a corresponding member, i.e., a member having the same name exists within the old object.

If a corresponding member exists, then on step 346, transformation step 308 is called recursively for the old member and the new member.

Each activation of transformation step 308, whether any transformation was successful or not, ends on step 350 in a call to transform hook function, procedure, method or another executable part. Transform hook function provides a user with the option to implement any special transformation between the old object and the new object, which could not have been determined automatically.

In some embodiments, a transformation program is provided which includes a transformation class having a transformation method implementing the steps of FIG. 3. The transformation method calls a transform hook method which is implemented by the user.

In some embodiments, the transform hook method is implemented as a single system-wide method. Therefore, it can be implemented as a nested "if" flow or as a "case" flow, in order to find out the type of the provided objects and perform the correct activities at each level. Alternatively, cross-level activities may also be required, for example as in host member 276 of network node 280 receiving the value of hostname member 226 of account node 216. Such cases can be handled when the hook transform method is called for a higher level, such as the appliance level which transforms appliance 212 into appliance 262.

It will be appreciated that the term "transform" does not relate to affecting the source object. Rather, the source object is left as is, and only the destination object is constructed according to data within the source object.

Referring now back to FIG. 2, and detailing how the transformation method is activated for the source object and destination object of FIG. 2. The transformation is initially called for source node 204 and destination node 254. The checks on steps 310 and 318 fail, and on step 334 it is determined that both are nodes. For the only member of destination node 254, being appliance list 258, it is determined on step 342 that a corresponding object exists in source node 204, and the method is called recursively for appliance list 208 of source node 204 and appliance list 258 of destination node 254.

On step 318 it is determined that the appliance list 208 and appliance list 258 are both lists. Then, on step 322, source appliance list 208 is traversed. For each appliance in source appliance list 208, such as source appliance node 212, a new appliance node 262 is created, and the transformation is called recursively for old appliance node 212 and new appliance node 262.

On this call to transformation step 308, it is determined on step 318 that old appliance node 212 and new appliance node 262 are nodes, and another recursive call is made with source account node 216 and destination account node 266. Then further calls are made on step 338 for the corresponding pairs of members of the account nodes. When the transformation is called for source login attribute 220 and destination login attribute 270, it is determined on step 310 that destination login 270 is an attribute, and on step 314 that source destination login is an attribute as well, and assuming that the attribute types are compatible, the login value of the source account is copied to the destination account.

The same sequence occurs for password attributes 222 and 272. However, no source member corresponding to destination full name member 273 is found, so the transformation is not called for this member, and destination full name member 273 remains with the default value.

The same sequence is repeated for source network node 230 and destination network node 280. Corresponding attribute objects are found and copied for attributes IP address 282, netmask 284, gateway 286 and interface 288.

No corresponding objects are found under source network object 230 for host attribute 276 and list of routes 290, which remain with their default value.

Going back in recursion to the appliance level, no corresponding object is found for admin object 290 of destination appliance 262.

At each call to transformation step 308, a step of calling transformation hook takes place, which is where the user can provide the transformation. The user can make an association between objects that should correspond by calling transform step 318. Alternatively, the user provides the exact transformation.

Thus, the transformation hook for the objects of FIG. 2, can comprise the following instructions: if the source object and the destination object are of appliance node type, then a transformation can be called to source appliance.web user interface and destination appliance.admin.

This call and recursive calls will take care of assigning the value of source listening port 244 to destination listening port 294. However, destination.management_protocol attribute 296 cannot be automatically assigned a value.

Therefore, the user should also indicate in transformation hook that if the source object is of web user interface node type, and the destination object is of admin node type, then admin.management_protocol equals 0 if source.is_https equals 1 and vice versa.

When transforming list objects on step 322, the destination object is assumed to be an empty list at the initial state. Therefore, in order to perform transformation, the elements of the source object are traversed and their contents are assigned to newly created destination list elements.

On the other hand, when transforming node objects on step 338, since all nodes are of known and static structure, it is the members of the destination object that are being traversed, and corresponding source members are searched for, in order to obtain source data that can be used in the destination object.

Thus, destination node members that have no corresponding source members will be assigned their default values, while source node members that have no corresponding destination members, such as source local data 248 will not be transformed and their values will not be used.

Therefore, this method is useful, among others, to situations in which the source object is, or contains nodes that are larger and contain more fields than the destination object. In this implementation, no resources are wasted for trying to find nonexistent corresponding destination members to source members.

Figure 4:
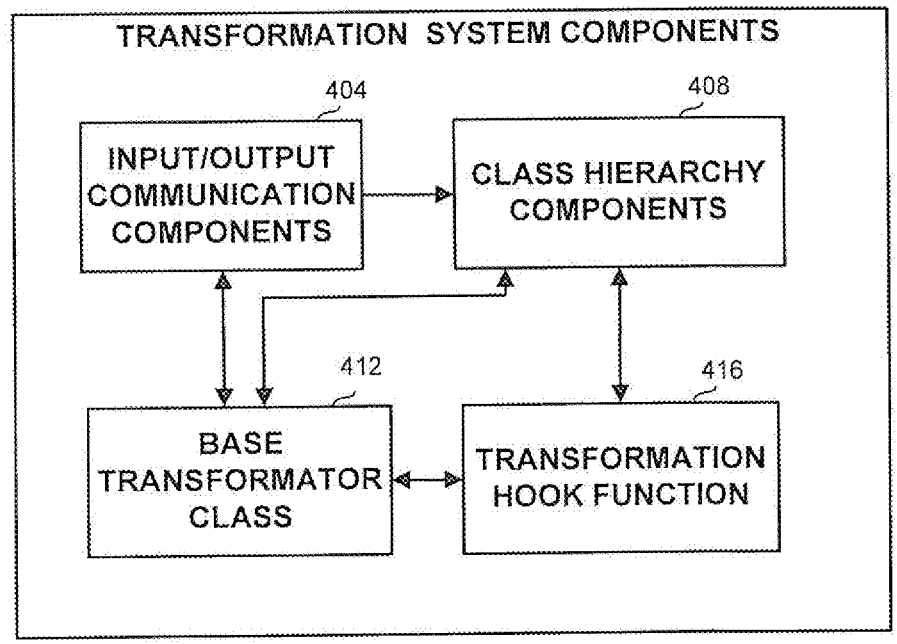
FIG. 4 shows a block diagram of the main components of a system for transforming between hierarchical objects in accordance with the disclosure.

Referring now to FIG. 4, displaying a block diagram of the main components of a system for transforming between hierarchical objects.

The transformation system is implemented as one or more sets of interrelated computer instructions, such as an executable, static library, Dynamic Link Library (DLL), class library, web service, or the like. The transformation can be implemented in any programming language such as C++, C#, Java or others, and under any development environment. The transformation system can be implemented in an object-oriented architecture, in a modular architecture, or the like. The transformation system is designed to be executed on any computing platform, such as a general purpose computer, a server, a personal computer, a mainframe computer, a server, a mobile device, or any other type of computing platform provisioned with a memory device, a CPU or microprocessor device, and I/O ports. Alternatively, the disclosure can be implemented as firmware ported for a specific processor such as digital signal processor (DSP) or microcontrollers, or can be implemented as hardware or configurable hardware such as field programmable gate array (FPGA) or application specific integrated circuit (ASIC).

The system comprises input and output communication components 404 for communicating with input and output devices such as display devices, keyboard, reading from and writing to files, communicating with databases, or the like.

The system further comprises the relevant class hierarchy implementation 408, whether as a library or as source code. The class hierarchy provides the classes, including for example the attributes, nodes and lists described in association with FIG. 1 above. The class hierarchy implementation provides the classes construction, destruction and other basic operations, parsing from plain text, XML, databases or others, formatting and storing, attribute value copying, iteration over list elements and node members, and the like.

The system comprises also base transformator class 412, which uses the class hierarchy functionality, and implements the method of FIG. 3 for automatically transforming all possible contents of a source object into a destination object. Transformator class 412 calls and may be called by a framework for user-implemented transformation routine, such as transformation hook function 416 which is also provided to the user. The user can implement in this function the non-automatic parts of the transformation, or override some automatic transformations.

The method and system provide easy and efficient transformation between objects deriving from the same hierarchy. The method and system can be utilized for a variety of uses, including upgrade of objects, for example when upgrading a product or service, transformation between databases and database schemas, or others. There is no requirement that the source and destination objects be hierarchically related, i.e., one of them is derived the other. Rather, the objects may be alien to each other, but should be implemented using the same basic types.

It will be appreciated that the disclosure can also be applied to a two-way transformation, in which it is required to transform an object of a first type into a corresponding object of a second type, and also vice versa.

It will be appreciated that although the method and system were demonstrated for a particular class hierarchy, the method and system can be adapted to any class hierarchy which provides self-awareness of an object to elements or members contained within the object. The method and system avoid unnecessarily traversing lists or member collections, thus facilitating efficient transformation. Efficiency is particularly important in messaging environments, in which it is required to transform objects or some aspects thereof into messages to be sent through a communication channels, and vice versa, i.e., constructing an object based on a smaller object received as part of a message.

The method and system can be used for transforming between objects residing in memory, between descriptions of such objects, such as in plain text, XML, LDAP, relational database or others, or a combination thereof, i.e. between a memory object and a description, or vice versa. If object descriptions are provided, the relevant objects are first constructed according to the description, followed by the transformation.

It will be appreciated by a person skilled in the art that the disclosed system is exemplary only and that multiple other implementations can be designed without deviating from the disclosure. Any component of the system can be implemented using proprietary, commercial or third party products.

It will be appreciated by persons skilled in the art that the present disclosure is not limited to what has been particularly shown and described hereinabove. Rather the scope of the present disclosure is defined only by the claims which follow.

What is claimed is:

1. A computerized method for transforming a source object into a destination object, comprising:

receiving the source object and the destination object, wherein the source object and the destination object are derived from a class hierarchy comprising at least one element and further comprising method members configured to operate on the at least one element and at least the at least one element of the source object is predeterminately annotated;

subject to the source object and the destination object having at least one element of attribute type, copying the value of the source object to the destination object by invoking at least one of the method members derived from the class hierarchy and contained within the source object;

subject to the source object and the destination object having at least one element of node type which comprises at least one member, for each member of the destination object:

invoking at least one of the method members derived from the class hierarchy and contained within the source object, thereby locating in the source object a corresponding member having a corresponding name, and transforming by a first transformation the at least one element of node type and the at least one corresponding member;

subject to the source object and the destination object having at least one element of list type, the source object adapted to contain list elements of a source type and the destination object adapted to contain list elements of a second type, for each list element of the source object:

invoking at least one of the method members derived from the class hierarchy and contained within the source object, thereby creating a corresponding default element of the second type and adding the default element to the destination object, and transforming by a second transformation the list element and the corresponding default element; and invoking a user-implemented transformation routine;

and wherein the method is automatically operative in response to commands from a command line interface.

2. The method of claim 1 further comprising retrieving from a storage device a description of the source object or the destination object and constructing the source object or the destination object.

3. The method of claim 1 wherein the source object and the destination object are hierarchical objects having members of types selected from the group consisting of: an attribute; a node comprising at least one attribute, node or list member; and a list adapted to contain at least one element, the at least one element being of type attribute or node.

4. The method of claim 1 wherein the destination object is an upgrade of the source object.

5. The method of claim 1 wherein the destination object is a message derived from the source object.

6. The method of claim 1 wherein the source object is derived from the destination object, the destination object representing a message.

7. The method of claim 1 wherein the source object and the destination object represent database objects.

8. A computerized method for transforming a source hierarchical object into a destination hierarchical object, comprising:

receiving a source hierarchical object and a destination hierarchical object, wherein at least the source object is predeterminately annotated, the source hierarchical object and the destination hierarchical object having members of types selected from the group consisting of: an attribute; a node comprising at least one attribute, node or list member; and a list adapted to contain at least one element, the at least one element being of type attribute or node, wherein the source hierarchical object and the destination hierarchical object are derived from a class hierarchy comprising method members configured to operate on the members of the cited types;

subject to the source hierarchical object and the destination hierarchical object being of attribute type, copying the value of the source hierarchical object to the destination hierarchical object by invoking at least one of the method members derived from the class hierarchy and contained within the source hierarchical object;

subject to the source hierarchical object and the destination hierarchical object being of node type which comprises at least one member, for each member of the hierarchical destination object:

invoking at least one of the method members derived from the class hierarchy and contained within the source hierarchical object, thereby locating a corresponding member having a corresponding name in the source hierarchical object, and transforming by a first transformation the member and the corresponding member;

subject to the source hierarchical object and the destination hierarchical object being of list type, the source hierarchical object adapted to contain elements of a first type and the destination hierarchical object adapted to contain elements of a second type, for each element of the source hierarchical object:

invoking at least one of the method members derived from the class hierarchy and contained within the source hierarchical object, thereby creating a corresponding default element of the second type, and transforming by a second transformation the element and the corresponding default element, and invoking a user-implemented transformation routine;

and wherein the method is automatically operative in response to commands from a command line interface.

9. A computer readable non-transitory storage medium containing a set of instructions for a general purpose computer, the set of instructions comprising:

receiving a source object and a destination object, wherein the source object and the destination object are derived from a class hierarchy comprising at least one element and further comprising method members configured to operate on the at least one element and at least the at least one element of at least the source object is predeterminately annotated;

subject to the source object and the destination object having at least one element of attribute type, copying the value of the source object to the destination object by invoking at least one of the method members derived from the class hierarchy and contained within the source object;

subject to the source object and the destination object having at least one element of node type which comprises at least one member, for each member of the destination object;

invoking at least one of the method members derived from the class hierarchy and contained within the source object, thereby locating a corresponding member having a corresponding name in the source object, and transforming by a first transformation the member and the corresponding member;

subject to the source object and the destination object having at least one element of list type, the source object adapted to contain elements of a first type and the destination object adapted to contain elements of a second type, for each element of the source object;

invoking at least one of the method members derived from the class hierarchy and contained within the source object, thereby creating a corresponding default element of the second type, and transforming by a second transformation the element and the corresponding default element; and invoking a user-implemented transformation routine;

and wherein the set of instructions is automatically operative in response to commands from a command line interface.

* * * * *